United States Patent
Oehler et al.

(10) Patent No.: US 10,288,048 B2
(45) Date of Patent: May 14, 2019

(54) DEFORMING SHAPE MEMORY ALLOY USING SELF-REGULATING THERMAL ELEMENTS

(71) Applicant: The Boeing Company, Chicago, IL (US)

(72) Inventors: Stephen D. Oehler, Maple Valley, WA (US); Jeffrey L. Duce, Maple Valley, WA (US); Frederick T. Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 105 days.

(21) Appl. No.: 15/381,761

(22) Filed: Dec. 16, 2016

(65) Prior Publication Data
US 2018/0171990 A1    Jun. 21, 2018

(51) Int. Cl.
| | | |
|---|---|---|
| *F03G 7/06* | (2006.01) | |
| *H05B 1/02* | (2006.01) | |
| *H05B 3/00* | (2006.01) | |

(52) U.S. Cl.
CPC .............. *F03G 7/065* (2013.01); *F03G 7/06* (2013.01); *H05B 1/0291* (2013.01); *H05B 3/0004* (2013.01)

(58) Field of Classification Search
CPC ..................................... F03G 7/065
USPC ................... 60/527–529; 310/307
See application file for complete search history.

(56) References Cited

U.S. PATENT DOCUMENTS

| | | |
|---|---|---|
| 5,817,188 A | 10/1998 | Yahatz et al. |
| 6,272,857 B1 | 8/2001 | Varma |
| 6,499,952 B1 | 12/2002 | Jacot et al. |
| 7,188,473 B1 * | 3/2007 | Asada ............. F03G 7/065 310/306 |
| 7,878,459 B2 | 2/2011 | Mabe et al. |
| 8,726,652 B1 | 5/2014 | Gunter |
| 2003/0188540 A1 | 10/2003 | Van Winkle |
| 2005/0069842 A1 | 3/2005 | Schleppenbach et al. |
| 2007/0247101 A1 * | 10/2007 | Noda ............. F03G 7/065 318/582 |

(Continued)

OTHER PUBLICATIONS

Ruggeri et al., Shape memory actuator systems and the use of thermoelectric modules, http://proceedings.spiedifitallibrary.org, Dec. 12, 2015, pp. 386-394.

(Continued)

*Primary Examiner* — Mark A Laurenzi
*Assistant Examiner* — Mickey H France
(74) *Attorney, Agent, or Firm* — Kunzler, Bean & Adamson

(57) ABSTRACT

Disclosed herein is an actuator for effectuating a shape memory alloy (SMA). The actuator includes a body including shape memory alloy. The body includes a plurality of segments. The actuator also includes a plurality of heaters that are each configured to maintain a predetermined temperature based on a predetermined resistance of the heater when a voltage is applied to the heater. Each heater of the plurality of heaters is associated with a different segment of the plurality of segments. A segment of the plurality of segments is effectuated in response to increasing a temperature of the heater associated with the segment.

20 Claims, 6 Drawing Sheets

(56) References Cited

U.S. PATENT DOCUMENTS

| | | | |
|---|---|---|---|
| 2011/0226345 A1* | 9/2011 | Bushnell | B64C 9/02 |
| | | | 137/15.01 |
| 2012/0174573 A1* | 7/2012 | Skurkis | D07B 1/0673 |
| | | | 60/527 |
| 2014/0255534 A1* | 9/2014 | Allen | B29C 33/308 |
| | | | 425/542 |
| 2014/0331665 A1 | 11/2014 | Shivashankara et al. | |
| 2016/0037633 A1* | 2/2016 | Downs | B32B 5/12 |
| | | | 361/749 |
| 2017/0113817 A1* | 4/2017 | Koehler | B64G 1/222 |
| 2018/0172172 A1 | 6/2018 | Oehler et al. | |

OTHER PUBLICATIONS

Selden, et al., Segmented Binary Control of Shape Memory Alloy Actuator Systems Using the Peltier Effect, International Conference on Robotics & Automation, Apr. 2004, pp. 4931-4936, New Orleans, LA.

"Material Solutions for Self-Limiting Heaters," Dupont, 2016, pp. 1-2, http://www.dupont.com/products-and-services/electronic-electrical-materials/printed-electronics/products/self-limiting-heaters.html accessed Dec. 15, 2016.

Jardin, et al., "Improved Design and Performance of the SMA Torque Tube for the DARPA Smart Wing Program," SPIE, Mar. 1999, pp. 260-269, vol. 3674, Newport Beach, California.

\* cited by examiner

DEFORMING SHAPE MEMORY ALLOY USING SELF-REGULATING THERMAL ELEMENTS

FIELD

This disclosure relates generally to components for vehicles, and more particularly to shape memory alloy that is integrated with heaters for manipulating the shape memory alloy.

BACKGROUND

Conventional systems that use shape memory alloy may utilize standard heaters to transform the shape memory alloy. These systems, however, may require a collection of sensors and feedback loops to provide information to controllers that are managing the standard heaters. These controllers, sensors, and feedback loops can be expensive, voluminous, and introduce points of failure into the system.

SUMMARY

The subject matter of the present application has been developed in response to the present state of the art, and in particular, in response to the shortcomings of deforming shape memory alloy that have not yet been fully solved by currently available techniques. Accordingly, the subject matter of the present application has been developed to provide a shape memory system, and associated apparatus and method, that overcome at least some of the shortcomings of prior art techniques.

Disclosed herein is an actuator that includes a body including shape memory alloy (SMA). The body includes a plurality of segments. The actuator also includes a plurality of heaters that are each configured to maintain a predetermined temperature based on a predetermined resistance of the heater when a voltage is applied to the heater. Each heater of the plurality of heaters is associated with a different segment of the plurality of segments. A segment of the plurality of segments is configured to be effectuated in response to increasing a temperature of the heater associated with the segment. The preceding subject matter of this paragraph characterizes example 1 of the present disclosure.

The body is formed from a unitary piece of SMA. The body is divided into a plurality of segments at thermal isolation portions along the unitary piece of SMA. The thermal isolation portions include portions of the unitary piece of SMA that have lower thermal conductivity than the thermal conductivity of each of the plurality of segments. The preceding subject matter of this paragraph characterizes example 2 of the present disclosure, wherein example 2 also includes the subject matter according to example 1, above.

The thermal isolation portions of the unitary piece of SMA are comprised of thicker SMA material than the SMA material forming each of the plurality of segments. The preceding subject matter of this paragraph characterizes example 3 of the present disclosure, wherein example 3 also includes the subject matter according to any one of examples 1-2, above.

Each segment of the plurality of segments of the body includes a separate piece of SMA. Each segment is coupled together in series along an axis to form the body. The preceding subject matter of this paragraph characterizes example 4 of the present disclosure, wherein example 4 also includes the subject matter according to example 1, above.

The actuator also includes a plurality of interfaces. Each interface is positioned between adjacent segments of the plurality of segments when coupled together to form the body. The interfaces include a material that has a lower thermal conductivity than a thermal conductivity of each of the plurality of segments. The preceding subject matter of this paragraph characterizes example 5 of the present disclosure, wherein example 5 also includes the subject matter according to example 4, above.

Each segment of the plurality of segments is effectuated to rotate at least a fraction of a full rotation of the body in response to increasing the temperature of the heater associated with the segment. The preceding subject matter of this paragraph characterizes example 6 of the present disclosure, wherein example 6 also includes the subject matter according to example 1, above.

A heater of the plurality of heaters is printed on a surface of a segment of the plurality of segments. The preceding subject matter of this paragraph characterizes example 7 of the present disclosure, wherein example 7 also includes the subject matter according to examples 1-6, above.

A heater of the plurality of heaters comprises a film that is one of bonded to a surface of a segment of the plurality of segments and spaced a distance from a surface of the respective segment of the plurality of segments, the at least one heater close enough to the surface of the respective segment to effectuate the respective segment. The preceding subject matter of this paragraph characterizes example 8 of the present disclosure, wherein example 8 also includes the subject matter according to examples 1-7, above.

Each heater of the plurality of heaters is configured to be heated to a predetermined temperature. The predetermined temperature is a temperature greater than or equal to an austenitic finish temperature of each segment of the plurality of segments. The preceding subject matter of this paragraph characterizes example 9 of the present disclosure, wherein example 9 also includes the subject matter according to examples 1-8, above.

Each heater of the plurality of heaters is comprised of a positive temperature coefficient (PTC) material. The preceding subject matter of this paragraph characterizes example 10 of the present disclosure, wherein example 10 also includes the subject matter according to examples 1-9, above.

The body comprises a cylindrical tube. The preceding subject matter of this paragraph characterizes example 11 of the present disclosure, wherein example 11 also includes the subject matter according to examples 1-10, above.

Disclosed herein is an actuation system for effectuating a shape memory alloy. The system includes a body that includes shape memory alloy (SMA). The body includes a plurality of segments. The system also includes a plurality of heaters that are each configured to maintain a predetermined temperature based on a predetermined resistance of the heater when a voltage is applied to the heater. Each heater of the plurality of heaters is associated with a different segment of the plurality of segments. The system further includes at least two electrically conductive contacts coupled to each heater of the plurality of heaters. The system also includes an electrical power source coupled to the at least two electrically conductive contacts of each of the heaters. The electrical power source supplies the voltage to each heater via the at least two electrically conductive contacts. The system includes a controller for controlling the electrical power source. A segment of the plurality of segments is configured to be effectuated in response to increasing a temperature of the heater associated with the segment. The preceding subject matter of this paragraph characterizes example 12 of the present disclosure.

The electrical power source supplies a constant voltage to each heater of the plurality of heaters. The preceding subject matter of this paragraph characterizes example 13 of the present disclosure, wherein example 13 also includes the subject matter according to example 12, above.

The controller is configured to determine which heaters of the plurality of heaters to actuate based on a determined total amount of actuation of the body. The controller triggers the electrical power source to provide a constant voltage to each of the determined heaters. The preceding subject matter of this paragraph characterizes example 14 of the present disclosure, wherein example 14 also includes the subject matter according to examples 12-13, above.

The electrical power source is one of a plurality of electrical power sources. Each of the plurality of electrical power sources is coupled to at least two electrically conductive contacts of a corresponding heater. The preceding subject matter of this paragraph characterizes example 15 of the present disclosure, wherein example 15 also includes the subject matter according to examples 12, above.

At least one of the one or more electrical power sources comprises a battery power source. The preceding subject matter of this paragraph characterizes example 16 of the present disclosure, wherein example 16 also includes the subject matter according to example 12, above.

Disclosed herein is a method for assembling an actuator system for effectuating a shape memory alloy. The method includes associating each of a plurality of heaters with different segments of an actuator. The segments of the actuator form a body including shape memory alloy (SMA). Each of the heaters is configured to maintain a predetermined temperature based on a predetermined resistance of the heater when a voltage is applied to the heater. The method further includes coupling each of the heaters to an electrical power source. The electrical power source is configured to apply the voltage to each of the heaters to effectuate one or more corresponding segments of the body. The preceding subject matter of this paragraph characterizes example 17 of the present disclosure.

The method also includes coupling each of a plurality of individual segments in series along an axis with an interface positioned between adjacent segments to form the body of the actuator. Each interface has a lower thermal conductivity than a thermal conductivity of each of the individual segments. The preceding subject matter of this paragraph characterizes example 18 of the present disclosure, wherein example 18 also includes the subject matter according to example 17, above.

The method further includes printing at least one heater of the plurality of heaters on a surface of a respective segment of the plurality of segments. The preceding subject matter of this paragraph characterizes example 19 of the present disclosure, wherein example 19 also includes the subject matter according to examples 17-18, above.

The method further includes bonding at least one heater of the plurality of heaters to a surface of a respective segment of the plurality of segments. The heater comprises a film. The preceding subject matter of this paragraph characterizes example 20 of the present disclosure, wherein example 20 also includes the subject matter according to examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

This disclosure provides an actuator, such as a torque tube, having a series of segments of shape memory alloy (SMA) that each include a heater on the surface of the segment. Each heater can be activated and deactivated separately to achieve a desired angular twist of the tube. Because the heaters can be switch off and on based on an application of a voltage to each of the heaters, there is no need to measure, store, and analyze the behavior of the SMA as opposed to conventional SMA devices. Accordingly, the sensors, controllers, and analytics associated with conventional SMA devise can be omitted. The heaters can be a film, ink, or coating that heats up when a voltage is applied to the heater until the heater becomes infinitely conductive, at which point the heater ceases to increase in temperature even as the voltage continues to be applied. Further, the segments allow for more discrete and predictable control of the actuation of the actuator.

Figure 1:
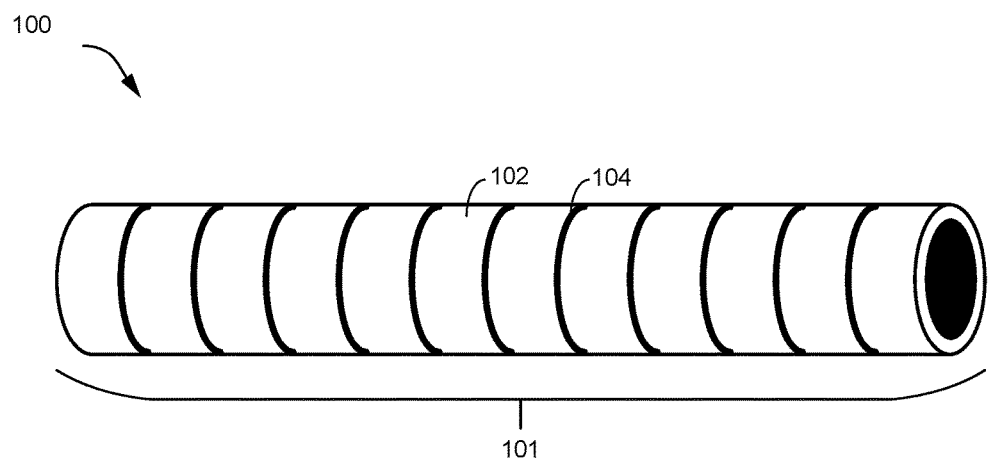
FIG. 1 is a schematic perspective view of an actuator comprising body of shape memory alloy according to one aspect.
Figure 2:
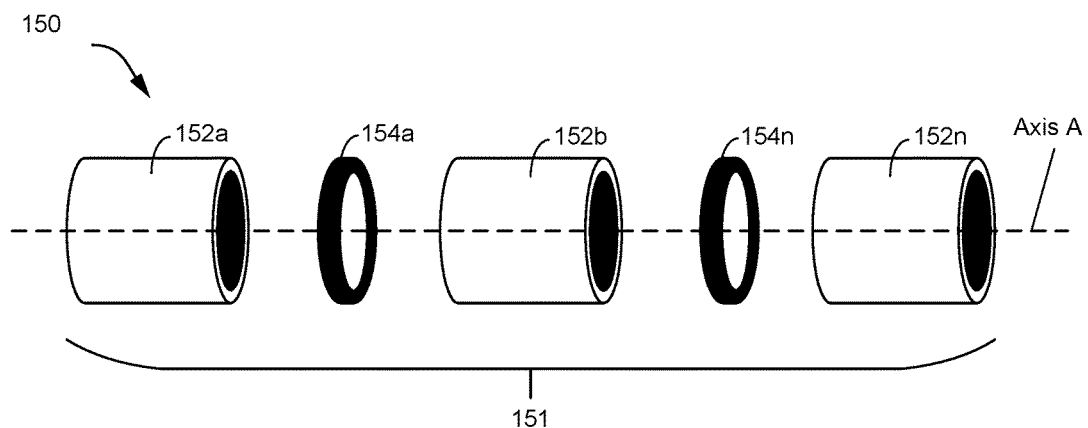
FIG. 2 is a schematic perspective view of an actuator comprising a body of shape memory alloy composed of individual shape memory alloys and interfaces according to another aspect.
Figure 3:
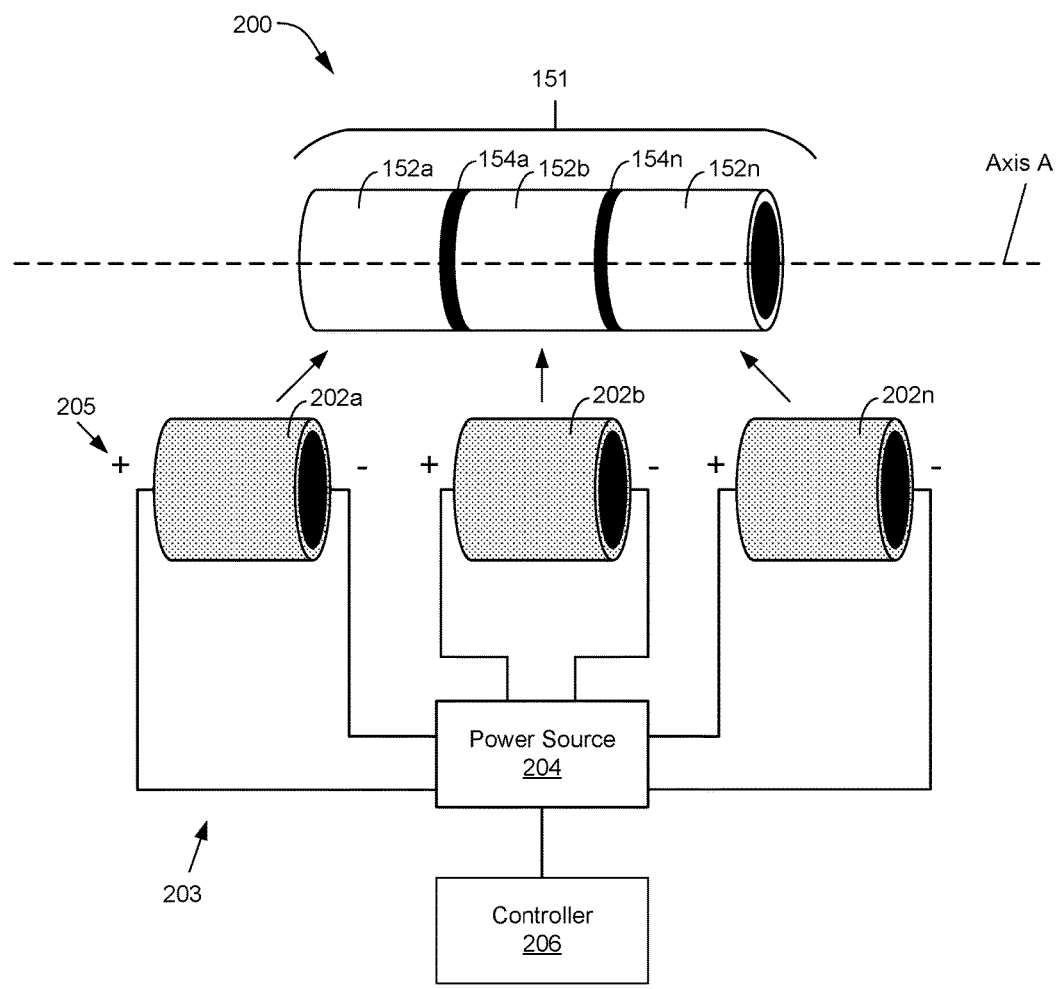
FIG. 3 is a schematic perspective view of an actuation system that includes the body of shape memory alloy as shown in FIG. 2 and resistance heaters.

Referring to at least FIGS. 1 to 3, an actuator 100, 150 includes a body 101, 151 including SMA. The body 101, 151 includes a plurality of segments 102, 152a-n (collectively 152). The actuator 100, 150 further includes a plurality of heaters 202 that are each configured to maintain a predetermined temperature based on a predetermined resistance of the heater 202 when a voltage is applied to the heater 202. Each heater 202 is associated with a different segment 102, 152a-n of the plurality of segments 102, 152. A particular segment 102, 152a-n can be effectuated in response to increasing a temperature of the heater 202 associated with the segment 102, 152a-n. When the actuator 100, 150 is included in an actuation system 200 the actuation system 200 includes the body 101, 151, the heaters 202, at least two electrically conductive contacts 205, an electrical power source 204, and a controller 206. The body 101, 151 can be operably coupled to a component of a vehicle, e.g., a door, hatch, window, or the like, such that the vehicle component is effectuated in response to the controller 206 actuating a segment 102, 152a-n of the body 101, 151.

Referring to FIG. 1, and according to one embodiment of an actuator 100, the actuator 100 includes a body 101 of SMA that includes a plurality of segments 102. More specifically, the body 101 is a single, unitary, continuous, piece of SMA and is divided into a plurality of segments 102 at thermal isolation portions 104 along the length of the body of SMA. As used herein, SMA is an alloy that "remembers" its original shape and that when deformed returns to its pre-deformed shape when heated. SMA material may be a lightweight, solid-state alternative to conventional actuators such as hydraulic, pneumatic, and motor-based systems.

In the embodiment depicted in FIG. 1, the body 101 is formed from a single, unitary, continuous piece of SMA. In one embodiment, the body 101 is divided into the plurality of segments 102 at thermal isolation portions 104. The thermal isolation portions 104 are defined by characteristics and/or properties of the SMA material at the thermal isolation portions 104. The SMA material at a thermal isolation portion 104 has different chemical, material, or structural properties that affect the thermal conductivity of the SMA material at a thermal isolation portion 104, e.g., the SMA body at a thermal isolation portion 104 does not conduct heat as well as a segment 102 of the SMA body, and/or the like. Preferably, the thermal isolation portions 104 are portions of the unitary piece of SMA that have lower thermal conductivity than the thermal conductivity of each of the plurality of segments 102. The lower thermal conductivity of the thermal isolation portions 104 prevents heat that is applied to a segment 102 from transferring to and affecting an adjacent segment 102, as described in more detail below. Additionally, or alternatively, the SMA material for a thermal isolation portion 104 is thicker than the SMA material for each segment 102.

In some embodiments, the actuator 100 and/or the body 101 of the actuator 100 has a cylindrical shape, e.g., a cylindrical tube; however, the actuator 100 can be any polygonal shape. The actuator 100 can also have various sizes (e.g., diameters), various lengths, various thicknesses, various diameters, and/or the like. In some embodiments, portions of the actuator 100 have different diameters or sizes than other portions. In some embodiments, the actuator 100 is hollow, is solid, or is hollow at some parts and solid in other parts. One of skill in the art will recognize the various configurations, properties, features, and/or the like of the actuator 100 in light of this disclosure.

In certain embodiments, the actuator 100 is used as a torque tube. In such an embodiment, each segment 102 of the actuator 100 is effectuated, actuated, deformed, or the like, e.g., using a self-regulating heater as described below, to cause each segment 102 to rotate, which ultimately causes the entire actuator 100 to rotate to a predetermined degree or angle of rotation. An actuator 100 as described herein, therefore, may be used in various vehicles, machinery, or the like, without the need for complex computers, feedback loops, or the like because simple on-off, self-regulating heaters may be used to effectuate a change in each segment 102 of the actuator 100.

FIG. 2 depicts another embodiment of an actuator 150 including a body 151 that includes a plurality of segments 152 of SMA. The segments 152 are separate segments of SMA 152n-a that are coupled together to form the body 151. Each segment 152a-n is coupled together, in series along an axis A. A plurality of interfaces 154a-n (collectively 154) are positioned between adjacent segments 152a-n. The segments 152 are coupled to an interface 154a-n and/or to another segment 152a-n using a coupling mechanism to form the body 151. For example, two segments 152a-n are coupled together with an interface 154a-n positioned in between using an adhesive coupling, a bonded coupling, a welded coupling, a threaded coupling, a friction coupling, and/or the like.

The interfaces 154 are made of a material that has a lower thermal conductivity than the thermal conductivity of the segments 152 of SMA forming the body 151. The lower thermal conductivity of the interfaces 154 prevents heat that is applied to a segment 152 from transferring to and affecting an adjacent segment 152, as described in more detail below. Additionally, or alternatively, each of the segments 152a-n can have different lengths, different thicknesses, different shapes, different diameters, different widths, and/or other different properties from at least one other segment 152a-n depending on the use of actuator 150. The interfaces 154 can be made of SMA material, rubber material, polyurethane material, plastic material, and/or the like.

FIG. 3 is a schematic perspective view of an actuation system 200 that includes the actuator 150, as described above with reference to FIG. 2, and heaters 202. The actuation system 200 could alternatively include the heaters 202 and the actuator 100, as depicted in FIG. 1. The heaters 202 are described below as being used with the actuator 150 of FIG. 2 for convenience, and such descriptions also apply when the resistance heaters 202 are used with the actuator 100 of FIG. 1.

The multiple heaters 202 depicted in FIG. 3 are self-regulating resistance heaters 202. As used herein, a "self-regulating" heater 202a-n is a heater 202a-n comprised of a material that has a predefined resistance and reaches a predetermined temperature associated with the predefined resistance when a voltage is applied to the resistance heater 202a-n. Accordingly, "self-regulating" as used herein refers to maintaining a predetermined temperature when a predetermined minimum voltage is applied.

In one embodiment, the resistance heaters 202 are made of positive thermal coefficient (PTC) material. PTC material, as used herein, is a material that becomes infinitely resistive when a voltage is applied to the PTC material and the voltage approaches a critical, predetermined, and/or threshold temperature. The critical temperature is based on the properties of the PTC material being used, e.g., the max temperature could be set as a function of the PTC material property. In some embodiments, the critical or predetermined temperature of a resistance heater 202a-n is set such that the critical temperature is equal to or greater than the austenitic finish temperature of the segment 152a-n associated with the resistance heater 202a-n.

In this manner, a resistance heater 202a-n that is made of PTC material acts as a simple on/off heater by applying a constant voltage to the resistance heater 202a-n because the critical/max temperature is preset based on the material properties of the PTC material that affects the resistance of the PTC material. In other words, with the supply of electrical power from an electrical power source (such as the power source 204 shown in FIG. 3) at a constant (e.g., unchanging) voltage, the unique properties of the PTC material allow the PTC material to self-limit its temperature to increase up to, but not exceeding, an equilibrium temperature. Furthermore, because the PTC material self-regulates its temperature, additional components and systems for regulating the temperature of a resistance heater 202a-n, such as complex computers, sensors, feedback loops, etc., are not necessary, as may be the case with conventional heaters. Moreover, resistance heaters 202 that are made of PTC material can be used in a variety of different ways because PTC material can be formed into various shapes, sizes, forms, or the like, such as ink, film, foils, etc. that can be applied to different surfaces using a variety of methods.

Each resistance heater 202a-n corresponds to a different segment 152a-n of the actuator 150. The resistance heaters 202 are or include a film, a foil, a band, a wrap, a sleeve, or other material that may be wrapped or placed around a segment 152a-n of the actuator 150 and bonded, applied, adhered, or the like to the segment 152. In such an implementation, the resistance heaters 202 have a shape that is substantially similar to the shape of the body 151 of the actuator 150, e.g., cylindrical, cubical, polygonal, etc. Additionally, or alternatively, the resistance heaters 202 are or include an ink that is printed, engraved, embedded, or the like onto the surface of a respective segment 152a-n.

In certain embodiments, each resistance heater 202a-n is located on an outer surface of a segment 152a-n and/or an inner surface of a segment 152a-n. The resistance heaters 202a-n can be a film, or the like, that is located on or otherwise forms a sleeve that slides over the body 151 and is spaced a distance from a surface of a respective segment 152a-n so that the resistance heaters 202a-n are close enough to the surface of the respective segment 152a-n to effectuate the respective segment 152a-n. The resistance heaters 202 are located on a separate sleeve, and then each sleeve can slide over the body 151 so that each sleeve is located relative to a particular segment 152a-n. Alternatively, the resistance heaters 202 are located on a single sleeve that spans the length of the body 151 such that, when the sleeve slides over the length of the body 151 each resistance heater 202a-n on the sleeve is located relative to a particular segment 152a-n of the body 151. In another alternative, between two and n−1 heaters 202 are included on one sleeve, and multiple sleeves are coupled to the body 151. For example, when four heaters 202a-n are included, two sleeves that each have two heaters 202a-n are coupled to the body 151 such that each heater 202a-n aligns with a respective segment 152a-n.

In some embodiments, each resistance heater 202a-n is coupled to at least two electrically conductive contacts 205, e.g., a positive and a negative contact, that are coupled to an electrical power source 204 using one or more electrical connections 203. The power source 204 is a battery, an AC/DC power source, or the like. The power source 204 can be a power source that is used in a vehicle, such as in an airplane, an automobile, etc. Furthermore, even though only one power source 204 is depicted in FIG. 3 for providing voltage to each resistance heater 202a-n, a plurality of power sources 204 may be included in the system 200. Each resistance heater 202a-n, for instance, can have a dedicated power source 204 for providing voltage to a particular resistance heater 202a-n. The power source 204 is configured to supply a constant voltage to each heater 202a-n.

The system 200 includes a controller 206 that controls the power source 204. The controller 206 is configured to enable or disable electrical power provided to a resistance heater 202a-n from the power source 204. For example, the controller 206 controls which segments 152a-n are actuated by controlling the power source 204 providing power to the resistance heaters 202a-n associated with a segment 152a-n of the body 151. As explained in more detail below, in some implementations, the controller 206 controls an amount of rotation of the actuator 150 by controlling power provided by the power source 204 to one or more resistance heaters 202a-n.

The controller 206 is configured to determine which heaters 202a-n to actuate based on a determined total amount of actuation of body 151. For example, if the desired total rotation of the body is 360°, and there are three segments 152a-n with three corresponding resistance heaters 202a-n that can each rotate 120°, then the controller will determine that each segment 152a-n needs to be actuated to rotate the entire body 151 360°. The controller 206 triggers or controls the electrical power source 204 to provide a constant voltage to each of the determined heaters 202a-n to effectuate the desired rotation of the body 151. The controller 206 determines the total desired rotation based on input from other components (e.g., other controllers or devices within a vehicle), based on user input, or the like.

In one embodiment, the interfaces 154a-n (or the thermal isolation portions 104 in the actuator 100 shown in FIG. 1) have low thermal conductivity relative to the segments 152 of the actuator 150. Accordingly, the controller 206 can actuate the actuator 150 in increments, e.g., per segment 152a-n, by activating individual resistance heaters 202a-n using the power source 204. The interfaces 154 will prevent heat from one resistance heater 202a-n affecting a segment 152a-n that is not associated with the activated resistance heater 202a-n. In other words, the interfaces block or prevent heat from transferring to a segment 152a-n that was not intended to be actuated.

In this manner, the actuator 150 can be incrementally controlled using several discrete resistance heaters 202a-n, e.g., PTC resistance heaters, located along the length of the body 151 of the actuator 150. As each resistance heater 202a-n is fully activated, the segments 152a-n of the body 151 transform and rotate. Each segment 152a-n is configured to be effectuated to rotate at least a fraction of a full rotation of the body 151 in response to increasing the temperature of the resistance heater 202a-n associated with the segment 152a-n. If each resistance heater 202a-n located along the length of the body 151 is fully activated, the entire actuator 150 is fully transformed and rotated.

Figure 4:
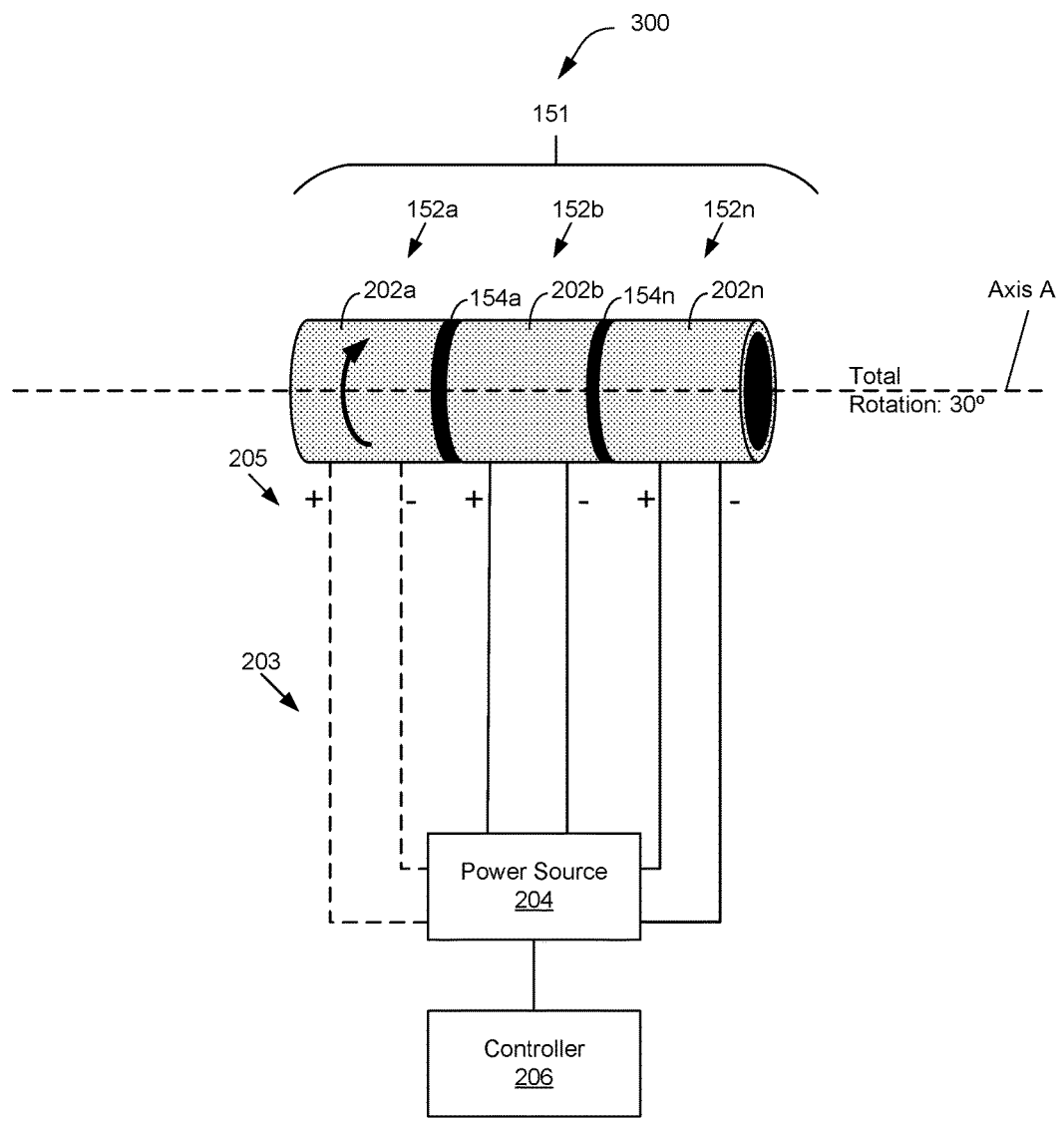
FIG. 4 is a schematic perspective view of the body of shape memory alloy coupled with resistance heaters as shown in FIG. 3, where the heaters are connected to a power source and a controller according to one aspect.

FIG. 4 is a schematic perspective view of an actuator 150, as described above with reference to FIG. 2, coupled with resistance heaters 202 that are connected to a power source 204 and a controller 206, as described above with reference to FIG. 3. In the depicted embodiment, the actuator 150 comprises a torque tube (e.g., the body 101, 151) comprised of SMA material of a particular length. For example, the torque tube has a length of 30 inches (in.) (76.2 centimeters (cm)). Accordingly, each segment 152a-n of the torque tube is about 10 in. (25.4 cm) in length. In order to rotate the torque tube 30°, the controller 206 triggers or controls the power source 204 to provide a constant voltage to the resistance heater 202a associated with a single segment 152a. In response to the voltage applied to the resistance heater 202a from the power source 204, the segment 152a of the torque tube associated with the activated resistance heater 202a rotates 30° in response to the heat produced by the respective resistance heater 202a.

Furthermore, the interface 154a between the transformed segment 152a and the adjacent segment 152b prevents the adjacent segment 152b from transforming and rotating because the interface 154a prevents thermal conduction of the heat produced by the activated resistance heater 202a.

Figure 5:
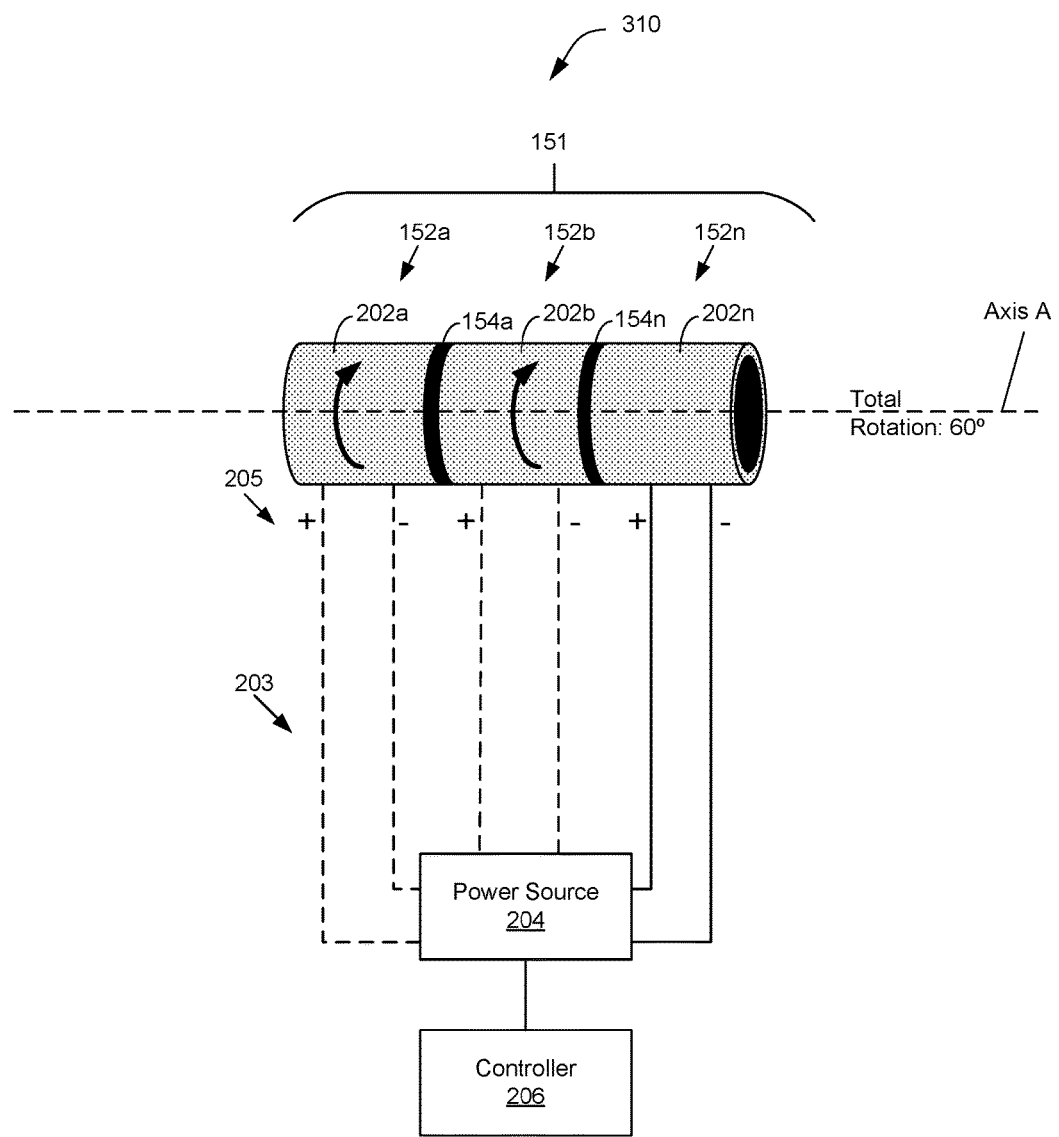
FIG. 5 is a schematic perspective view with the body of shape memory alloy coupled with resistance heaters as shown in FIG. 3, where the heaters are connected to a power source and a controller according to another aspect.

FIG. 5 is a schematic perspective view of an actuator 150 embodied as a torque tube coupled with resistance heaters 202a-n that are connected to a power source 204 and a controller 206, as depicted above with reference to FIG. 4. Similar to the embodiment 300 depicted in FIG. 4, in order to rotate the torque tube another 30° so that the total rotation of the torque tube is 60°, the controller 206 triggers or controls the power source 204 to provide a constant voltage to the resistance heater 202b associated with the adjacent segment 152b of the torque tube, in addition to the voltage applied to the first activated resistance heater 202a. In response to the voltage applied to the resistance heater 202b from the power source 204, the segment 152b of the torque tube associated with the activated resistance heater 202b rotates 30° in response to the heat produced by the resistance heater 202b.

Furthermore, the interface 154n between the transformed segment 152b and the end segment 152n prevents the end segment 152n from transforming and rotating because the interface 154n prevents thermal conduction of the heat produced by the activated resistance heater 202b.

Figure 6:
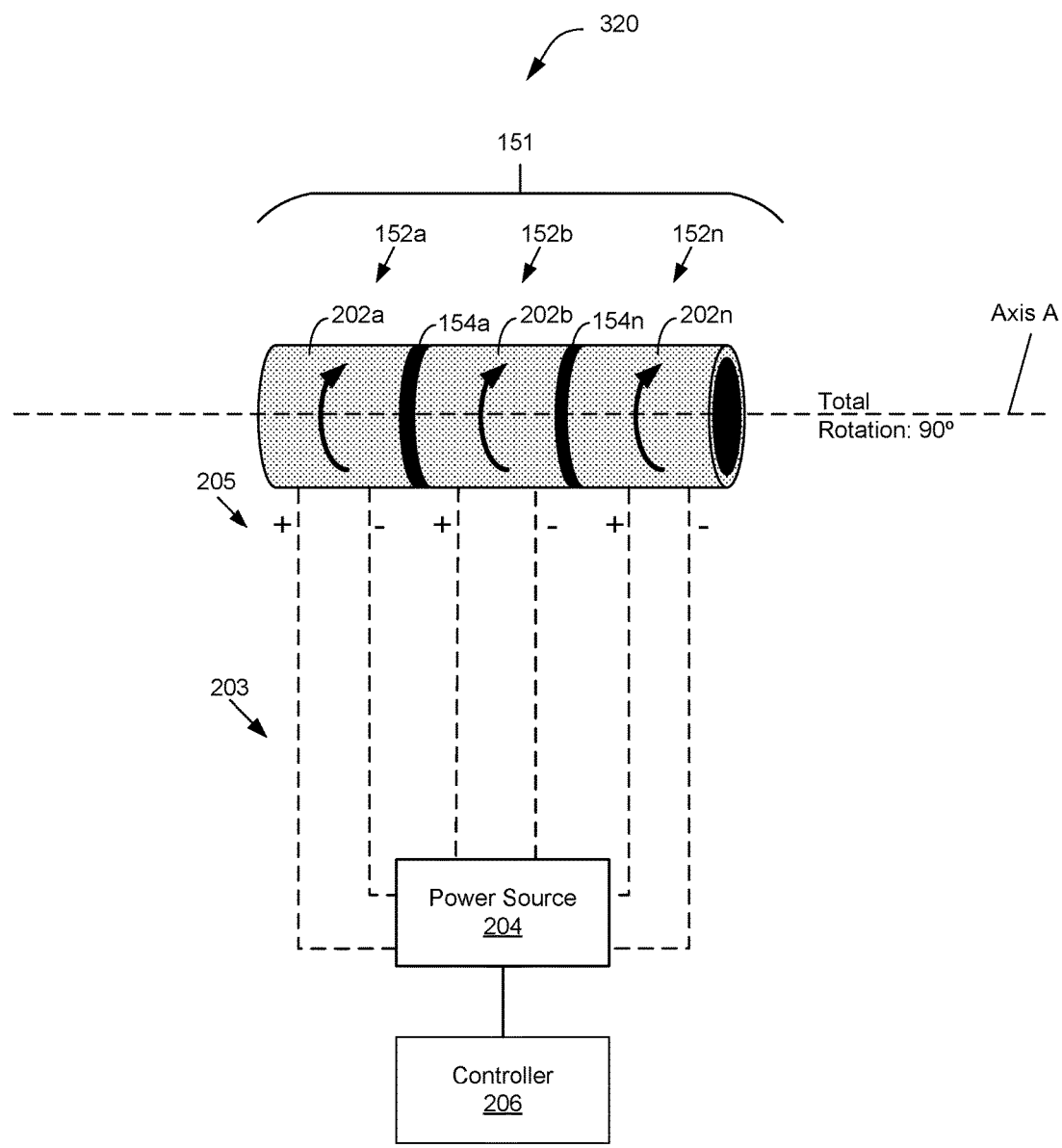
FIG. 6 is a schematic perspective view of a body of shape memory alloy coupled with resistance heaters as shown in FIG. 3, where the heaters are connected to a power source and a controller according to a further aspect.

FIG. 6 is a schematic perspective view of an actuator 150 embodied as a torque tube coupled with resistance heaters 202 that are connected to a power source 204 and a controller 206, as depicted above with reference to FIGS. 4 and 5. In order to rotate the torque tube another 30° so that the total rotation of the torque tube is 90°, the controller 206 triggers the power source 204 to provide a constant voltage to the resistance heater 202n associated with the end segment 152n, in addition to the voltages applied to the first activated resistance heater 202a and the second activated resistance heater 202b. In response to the voltage applied to the resistance heater 202n from the power source 204, the segment 152n of the torque tube associated with the activated resistance heater 202n rotates 30° in response to the heat produced by the resistance heater 202n such that the torque tube achieves its full rotation of 90°.

In this manner, an actuator 100, 150, as depicted in FIGS. 1 and 2, is incrementally controlled, actuated, effectuated, or the like, using resistance heaters 202 of PTC material. Furthermore, the resistance heaters 202a-n can be individually controlled without using additional controllers, sensors, feedback loops, etc. These unnecessary components can be removed from vehicles that may have required them for controlling conventional heaters, which reduces the weight of the vehicle, removes failure points in a system, and creates additional space for other components of the vehicle.

Figure 7:
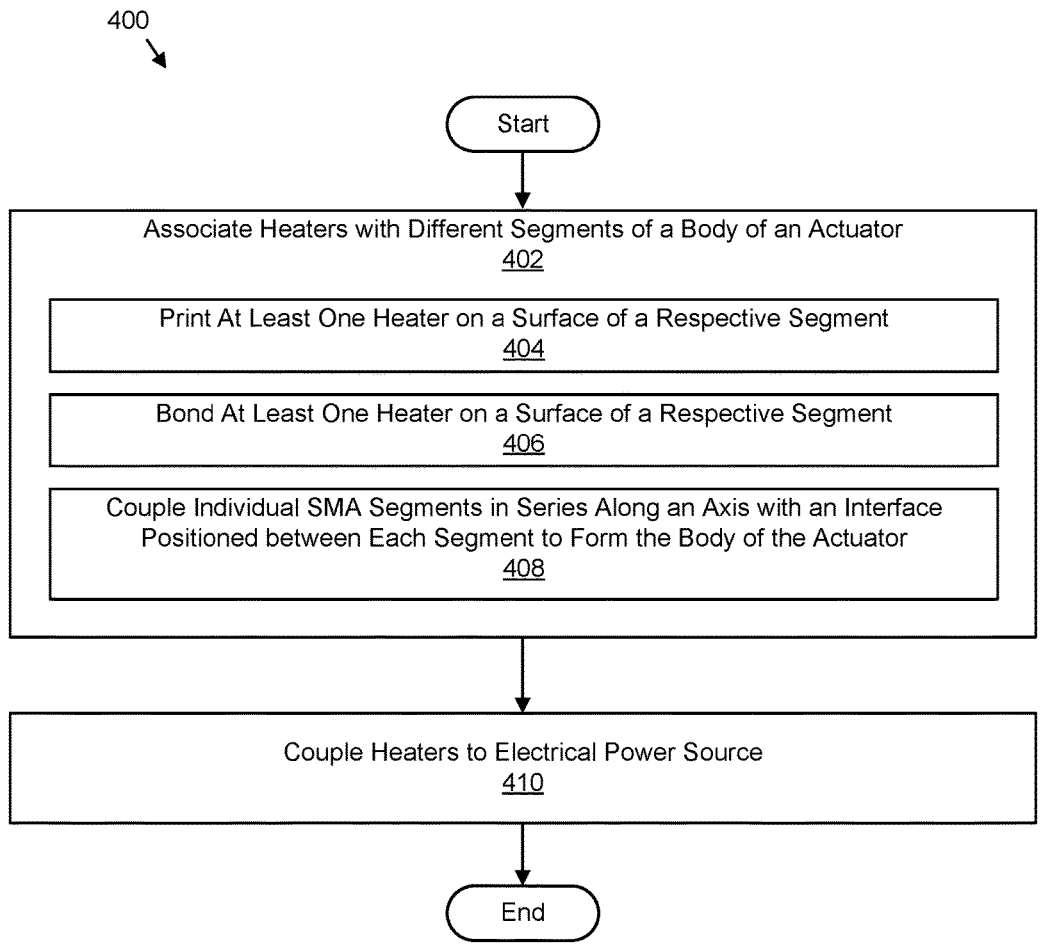
FIG. 7 is a schematic flow diagram of a method of assembling an actuator system for effecting a shape memory alloy according to one aspect.

Referring to FIG. 7, one embodiment of a method 400 of assembling an actuator system 200, as depicted in FIG. 3, that includes an actuator 150, as depicted in FIG. 2, and self-regulating resistance heaters 202a-n, power sources 204, and controllers 206, as depicted in FIGS. 3-6 is disclosed. Notwithstanding, other SMA manufacturing techniques could be used to make and/or assemble an actuator system 200, which includes an actuator 150 that can be manipulated using resistance heaters 202a-n as described herein without departing from the essence of the present disclosure. The method 400 can also be used to assemble an actuator system 200 that includes the actuator 100.

The method 400 begins and includes associating 402 each heater 202a-n of a plurality of heaters 202 with different segments 102, 152a-n of a body 101, 151 of an actuator 100, 150. Each resistance heater 202a-n is associated with different segments 102, 152a-n by adhering, bonding, printing, or the like, the resistance heaters 202a-n to the surfaces of the segments 102, 152a-n. Each segment 102, 152a-n together forms a body 101, 151 of the actuator 100, 150 that includes SMA. Each of the heaters 202a-n is configured to maintain a predetermined temperature based on a predetermined resistance of the heater 202a-n when a voltage is applied to the heater 202a-n.

Additionally, or alternatively, the method 400 includes printing 404 at least one heater 202a-n on a surface of a respective segment 102, 152a-n. Additionally, or alternatively, the method 400 includes bonding 406 at least one heater 202a-n, embodied as a film, to a surface of a respective segment 102, 152a-n.

Additionally, or alternatively, the method 400 includes coupling 408 each of a plurality of individual segments 152a-n in series along an axis A with an interface 154a-n positioned between each segment 152a-n to form the body 151 of the actuator 150.

To assemble the actuator system 200 having the actuator 100, 150, the method 400 further includes coupling 410 each of the heaters 202a-n to at least one electrical power source 204. More specifically, one or more electrical power sources 204 are coupled to the electrically conductive contacts 205 of the heaters 202a-n using one or more electrical connections 203. As discussed above, the electrical power source 204 is configured to apply the voltage to each of the heaters 202a-n to effectuate one or more corresponding segments 102, 152a-n of the body 101, 151, and the method 400 ends.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The described features, structures, or characteristics of the embodiments may be combined in any suitable manner. In the above description, numerous specific details are provided to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An actuator, comprising:
a body including shape memory alloy (SMA), the body comprising a plurality of segments; and
a plurality of heaters each configured to maintain a predetermined temperature based on a predetermined resistance of the heater when a voltage is applied to the heater, each heater of the plurality of heaters forming a sleeve that fully surrounds an exterior surface of a corresponding segment of the plurality of segments, each sleeve having a shape that corresponds to the shape of the corresponding segment of the plurality of segments,
wherein a segment of the plurality of segments is configured to be effectuated in response to increasing a temperature of the heater associated with the segment.

2. The actuator of claim 1, wherein:
the body is formed from a unitary piece of SMA; and
the body is divided into a plurality of segments at thermal isolation portions along the unitary piece of SMA, the thermal isolation portions comprising portions of the unitary piece of SMA that have a lower thermal conductivity than a thermal conductivity of each of the plurality of segments.

3. The actuator of claim 2, wherein the thermal isolation portions of the unitary piece of SMA are comprised of thicker SMA material than the SMA material forming each of the plurality of segments.

4. The actuator of claim 1, wherein each segment of the plurality of segments of the body comprises a separate piece of SMA, each segment coupled together in series along an axis to form the body.

5. The actuator of claim 4, further comprising a plurality of interfaces, each interface positioned between adjacent segments of the plurality of segments when the plurality of segments and the plurality of interfaces are coupled together to form the body, the interfaces comprising a material having a lower thermal conductivity than a thermal conductivity of each segment of the plurality of segments.

6. The actuator of claim 1, wherein each segment of the plurality of segments is effectuated to rotate at least a fraction of a full rotation of the body in response to increasing the temperature of the heater associated with the segment.

7. The actuator of claim 1, wherein at least one heater of the plurality of heaters is printed on a surface of a respective segment of the plurality of segments.

8. The actuator of claim 1, wherein at least one heater of the plurality of heaters comprises a film that is one of:
bonded to a surface of a respective segment of the plurality of segments; and
spaced a distance from a surface of the respective segment of the plurality of segments, the at least one heater close enough to the surface of the respective segment to effectuate the respective segment.

9. The actuator of claim 1, wherein each heater of the plurality of heaters is configured to be heated to a predetermined temperature, the predetermined temperature being a temperature greater than or equal to an austenitic finish temperature of each segment of the plurality of segments.

10. The actuator of claim 1, wherein each heater of the plurality of heaters comprises a positive temperature coefficient (PTC) material.

11. The actuator of claim 1, wherein the body comprises a cylindrical tube.

12. An actuation system, comprising:
a body including shape memory alloy (SMA), the body comprising a plurality of segments;
a plurality of heaters each configured to maintain a predetermined temperature based on a predetermined resistance of the heater when a voltage is applied to the heater, each heater of the plurality of heaters forming a sleeve that fully surrounds an exterior surface of a corresponding segment of the plurality of segments, each sleeve having a shape that corresponds to the shape of the corresponding segment of the plurality of segments;
at least two electrically conductive contacts coupled to each heater of the plurality of heaters;
an electrical power source coupled to the at least two electrically conductive contacts of each of the heaters, the electrical power source supplying the voltage to each heater via the at least two electrically conductive contacts; and
a controller for controlling the electrical power source,
wherein a segment of the plurality of segments is configured to be effectuated in response to increasing a temperature of the heater associated with the segment.

13. The actuation system of claim 12, wherein the electrical power source is configured to supply a constant voltage to each heater of the plurality of heaters.

14. The actuation system of claim 13, wherein the controller is configured to determine which heaters of the plurality of heaters to actuate based on a determined total amount of actuation of the body, the controller triggering the electrical power source to provide a constant voltage to each of the determined heaters.

15. The actuation system of claim 12, wherein the electrical power source is one of a plurality of electrical power sources, each of the plurality of electrical power sources being coupled to at least two electrically conductive contacts of a corresponding heater.

16. The actuation system of claim 12, wherein at least one of the one or more electrical power sources comprises a battery power source.

17. A method for assembling an actuator system, the method comprising:
associating each of a plurality of heaters with different segments of a plurality of segments of an actuator, the plurality of segments of the actuator forming a body including shape memory alloy (SMA), each of the heaters configured to maintain a predetermined temperature based on a predetermined resistance of the heater when a voltage is applied to the heater, each of the heaters forming a sleeve that fully surrounds an exterior surface of a corresponding segment of the plurality of segments, each sleeve having a shape that corresponds to the shape of the corresponding segment of the plurality of segments; and
coupling each of the heaters to an electrical power source, the electrical power source configured to apply the voltage to each of the heaters to effectuate one or more corresponding segments of the body.

18. The method of claim 17, further comprising coupling each of a plurality of individual segments in series along an axis with an interface positioned between adjacent segments to form the body of the actuator, each interface having a lower thermal conductivity than a thermal conductivity of each of the individual segments.

19. The method of claim 17, further comprising printing at least one heater of the plurality of heaters on a surface of a respective segment of the plurality of segments.

20. The method of claim 19, further comprising bonding at least one heater of the plurality of heaters to a surface of a respective segment of the plurality of segments, the heater comprising a film.

* * * * *